Patented Nov. 9, 1948

2,453,234

UNITED STATES PATENT OFFICE 2,453,234

PROCESS FOR THE PREPARATION OF AMINO - CARBOXYLIC - ACIDS FROM LACTAMS

Theodoor Koch, Oosterbeek, Netherlands, assignor, by mesne assignments, to American Enka Corporation, Enka, N. C., a corporation of Delaware No Drawing. Application July 7, 1947, Serial No. 759,476. In the Netherlands August 14, 1946

8 Claims. (Cl. 260—534)

This invention relates to the production of organic amino carboxylic acids from their corresponding lactams. More particularly, the invention relates to methods for the preparation of omega-amino saturated aliphatic carboxylic acids having at least six carbon atoms, and corresponding to the formula

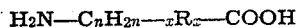

where $n$ is an integer at least 5, $x$ is a small whole number including 0, and R is a lower alkyl radical, by hydrolyzing appropriate lactams with water at high temperatures.

One of the principal objects of the present invention is to provide a new and improved method for synthesizing an omega-amino carboxylic acid, and particularly the class of omega-amino straight-chain saturated carboxylic acids having from six to ten carbon atoms in the chain. A still further object of the invention is the preparation of omega-amino carboxylic acids by a method that is simple and that does not involve an undesirably high conversion of the starting material into relatively less desired side reaction products.

The manner in which these and other objects and features of the invention are attained will appear more fully from the following description thereof, in which reference is made to typical and preferred procedures in order to indicate more fully the nature of the invention, but without intending in any way to limit the scope of the invention thereby.

It has already been proposed to convert lactams into the corresponding amino carboxylic acids by hydrolysis of the appropriate lactam with a strong acid; for example, see Wallach, Ann. d. Chem. 1900, page 188, Eck and Marvel, J. Biol. Chem. 1934, page 387, and Dutch Patent No. 56,318. This method is difficult to apply in practice, especially on any substantial scale, in view of the fact that difficult and costly operations are necessary for obtaining the free amino carboxylic acid in a relatively pure state. Generally speaking, the pure amino carboxylic acids are not directly obtained by such a process, because the strong acids that are employed for the hydrolysis step form salt combinations with the amino-groups of the amino carboxylic acids that are obtained, and it is extremely difficult to recover the free amino carboxylic acids in pure form from the resulting reaction products. For example, when the process set forth in Dutch Patent No. 56,318 is employed it has been found that the precipitation of the sulphuric acid with calcium hydroxide or with barium hydroxide does not proceed quantitatively because of the disturbing effect of the presence of the amino carboxylic acid. Furthermore, in the hydrolysis of lactams with hydrochloric acid as described in the above-mentioned literature references, it is necessary to remove large quantities of chlorine the last traces of which must be removed with silver oxide, an operation which consumes much time as well as being very expensive.

According to the present invention, it has been found that the preparation of pure free amino carboxylic acids from lactams having from 6 to 10 ring carbon atoms can be greatly facilitated, and can be accomplished without the necessity for using strong acids with the consequent production of difficultly separable salts of the amino acids, by the following simple procedure: The lactams are converted into the desired free amino carboxylic acids by hydrolyzing them at high temperatures with water, the water being present in the reaction mixture in the ratios set forth hereinafter.

Before proceeding further it is desired to point out that it has already been proposed (Dutch Patent No. 54,864) to heat lactams under pressure with water in order to obtain linear polyamides. In such case, however, the molecular ratio of water to lactam is disclosed as preferably not in excess of 4:1. In no case was it proposed to employ a water:lactam ratio of more than 10:1. Furthermore, the objective was the production of linear polyamides, not the free amino carboxylic acids.

In accordance with the present invention, however, when it is desired to produce the corresponding amino carboxylic acids by hydrolysis of the lactams, it is necessary to use considerably higher ratios of water than the 4:1 ratio that represents the preferred procedure of the Dutch patent just cited, the ratios being apparently, to some degree at least, dependent upon the number of carbon atoms in the lactam ring.

Even though employing water:lactam ratios as low as 12:1 an appreciable conversion of the lactam to amino carboxylic acid will result. Generally speaking, somewhat higher water:lactam ratios are preferably employed, although it may be pointed out that there is no critical upper limit to this ratio. In practice one of course will not use a higher ratio than is strictly necessary to produce the desired results in any given case, in view of the fact that to do so would render the process unnecessarily expensive from the point of view of recovering the desired product in pure form. As will appear hereinafter, water:lactam ratios of about 50:1 have proved to be very effective. Hence it can be stated as a general rule that water:lactam ratios varying from more than 10:1 to about 50:1, on a molecular basis, are satisfactory. The optimum ratio within this range for the hydrolysis of any given lactam can be readily determined by those skilled in the art without departing from the metes and bounds of the present invention.

The hydrolysis reaction may be carried out over a wide range of temperatures, but at temperatures below 150° C. it is generally found that the velocity of reaction may be too low for practical purposes. On the other hand, it is generally not desirable to exceed temperatures above 300° C. inasmuch as undesired side reactions, such as thermal cracking, may then taken place. Accordingly, it may be stated as a general rule that temperatures in the range of 150° to 300° C. are satisfactory, with temperatures nearer the upper end of this range usually preferred. Temperatures of approximately 250° to 260° C. are particularly desirable.

If desired, under some circumstances it may be preferred to accelerate the hydrolysis reaction by the addition of a suitable catalyst such as an aliphatic monocarboxylic acid, an aliphatic monoamine or an aliphatic diamine. A small quantity of an amino carboxylic acid will also accelerate the reaction. Examples of such catalysts are acetic acid, ethylamine, ethylene-diamine and, in the case of the amino carboxylic acid, it is generally preferred to introduce into the reaction mixture a small quantity of the same amino carboxylic acid which it is the purpose of the process to prepare. Very small quantities of the catalyst are sufficient, such as from hardly more than a trace up to about 1% based on the weight of lactam in the reaction mixture.

The reaction product obtained, consisting of an aqueous solution of the amino carboxylic acid resulting from the hydrolysis, may be treated in any desired manner in order to obtain the amino carboxylic acid in dry or relatively pure form. For example, the aqueous solution may be subjected to evaporation, or the amino carboxylic acid can be crystallized after a preceding concentration by adding alcohol, acetone, dioxane, or a similar solvent or diluent.

In order to indicate still more fully the nature of the present invention, the following examples of typical procedure are set forth, it being understood that these examples are presented as illustrative only and that they are not intended to limit the scope of the invention:

Example I 5 kg. of caprolactam were heated with 40 liters of water in a pressure vessel at 250° C. for a period of four hours. These quantities of reactants correspond to a water:lactam molecular ratio of 50:1. After cooling, the small quantity of the non-soluble substance that is formed is filtered off, and the filtrate is evaporated as far as possible. The resulting concentrate is mixed with three times its volume of strong alcohol, thereby causing the desired product, epsilon-amino-caproic-acid (6-amino-hexanoic acid), to crystallize out. After separating the crystalline product thus obtained, a further quantity of epsilon-amino-caproic acid can be obtained from the mother liquid if desired.

Example II

One kg. of methyl-cyclo-octanone-isoxime (lactam) was heated with 6 liters of water and 2 grams of acetic acid in a pressure vessel at 260° C. for a period of three hours. These quantities of reactants correspond to a water:isoxime molecular ratio of 46:1. At the end of this heating period the reaction product was decolorized with a small quantity of carbon, evaporated to a volume of about 1.5 liters, and mixed with acetone until no further crystallization of the products occurred. In this manner there was obtained a pure 8-amino-methyl-octanoic acid in a yield of about 85%.

While various specific examples of preferred methods embodying the present invention have been described above, it will be apparent that many changes and modifications may be made in the methods of procedure. It should therefore be understood that the examples cited and the methods of procedure set forth above are intended as illustrative only and are not intended to limit the scope of the invention.

What is claimed is:

1. A process for the preparation of an amino carboxylic acid from a lactam, comprising hydrolyzing the lactam at a temperature between 150° and 300° C. by means of a hydrolyzing agent consisting essentially of more than 10 mols of water per mol of lactam, and separating the amino carboxylic acid from the hydrolysis products.

2. A process according to claim 1, characterized in that the hydrolysis reaction is conducted in the presence of acetic acid as catalyst.

3. A process for the preparation of an amino carboxylic acid from a lactam having from 6 to 10 ring carbon atoms, comprising hydrolyzing the lactam at a temperature between 150° and 300° C. by means of a hydrolyzing agent consisting essentially of more than 10 mols but not greatly in excess of 50 mols of water per mol of lactam, and separating from the hydrolysis products the amino carboxylic acid thereby produced.

4. A process according to claim 3, characterized in that the hydrolysis reaction is conducted in the presence additionally of a small quantity of acetic acid as catalyst.

5. A process according to claim 3, characterized in that the lactam is caprolactam and the amino carboxylic acid is epsilon-amino-caproic acid.

6. A process according to claim 5, characterized in that the reaction temperature is about 250° C. and the water:lactam ratio is about 50:1.

7. A process according to claim 3, characterized in that the lactam is methyl-cyclo-octanone-isoxime and the amino carboxylic acid is 8-amino-methyl-octanoic acid.

8. A process according to claim 7, characterized in that the reaction temperature is about 260° C. and the water:isoxime ratio is about 46:1.

THEODOOR KOCH.

REFERENCES CITED

The following references are of record in the file of this patent:

UNITED STATES PATENTS

| Number | Name | Date |
|---|---|---|
| 2,327,119 | Martin | Aug. 17, 1943 |

FOREIGN PATENTS

| Number | Country | Date |
|---|---|---|
| 54,864 | Netherlands | July 15, 1943 |

OTHER REFERENCES

McLaren, Microfilm Extracts, vol. 5, No. 2, pages 39-41 (1944).

Moncrieff, Mon. Chem. Mon. Perfumer, (1946), vol. XVII, 6, page 231.